United States Patent
Ma et al.

(10) Patent No.: US 10,824,632 B2
(45) Date of Patent: Nov. 3, 2020

(54) SYSTEM AND METHOD FOR GENERATING EVENT VISUALIZATIONS

(71) Applicant: Palantir Technologies Inc., Palo Alto, CA (US)

(72) Inventors: Jason Ma, Palo Alto, CA (US); Brian Lee, Sunnyvale, CA (US); Evan Minamoto, Menlo Park, CA (US)

(73) Assignee: PALANTIR TECHNOLOGIES INC., Denver, CO (US)

( * ) Notice: Subject to any disclaimer, the term of this patent is extended or adjusted under 35 U.S.C. 154(b) by 0 days.

(21) Appl. No.: 16/685,853

(22) Filed: Nov. 15, 2019

(65) Prior Publication Data

US 2020/0226128 A1    Jul. 16, 2020

Related U.S. Application Data

(63) Continuation of application No. 15/851,249, filed on Dec. 21, 2017, now Pat. No. 10,482,097, which is a
(Continued)

(51) Int. Cl.
*G06F 16/248* (2019.01)
*G06T 11/20* (2006.01)
(Continued)

(52) U.S. Cl.
CPC .......... *G06F 16/248* (2019.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 6,594,672 B1 * 7/2003 Lampson .............. G06F 16/283
8,520,002 B2 * 8/2013 Stambaugh ......... G06F 3/04817
345/441
(Continued)

FOREIGN PATENT DOCUMENTS

AU    2014201568    6/2019

OTHER PUBLICATIONS

A. Kalyanpur et al., "Structured data and inference in DeepQA," in IBM Journal of Research and Development, vol. 56, No. 3.4, pp. 10:1-10:14, May-Jun. 2012, doi: 10.1147/JRD.2012.2188737. (Year: 2012).*

(Continued)

*Primary Examiner* — James A Thompson
(74) *Attorney, Agent, or Firm* — Knobbe, Martens, Olson & Bear, LLP

(57) ABSTRACT

An event matrix may comprise labels and indicators corresponding to objects and links of an ontology. The objects and links may be determined from a plurality of data sources by a data integration system. Some of the labels may correspond to event objects, and may be arranged in a first spatial dimension at least in part on the basis of dates associated with said event objects. Other labels may correspond to non-event objects, and may be arranged in a second spatial dimension. Indicators may correspond to links between the event and non-event objects. An indicator for a particular link may be positioned with respect to the first and second spatial dimensions in accordance with the locations of the labels that correspond to the objects connected by the link.

20 Claims, 6 Drawing Sheets

US 10,824,632 B2
Page 2

Related U.S. Application Data continuation of application No. 15/397,562, filed on Jan. 3, 2017, now Pat. No. 9,852,195, which is a continuation of application No. 14/570,914, filed on Dec. 15, 2014, now Pat. No. 9,626,088, which is a continuation of application No. 14/135,289, filed on Dec. 19, 2013, now Pat. No. 8,917,274.

(60) Provisional application No. 61/798,581, filed on Mar. 15, 2013.

(51) Int. Cl.
*G06F 16/955* (2019.01)
*G06Q 10/06* (2012.01)
*G06F 3/0484* (2013.01)
*G06F 3/0482* (2013.01)
*G09B 29/00* (2006.01)

(52) U.S. Cl.
CPC ........ *G06F 3/04847* (2013.01); *G06F 16/955* (2019.01); *G06Q 10/067* (2013.01); *G06T 11/206* (2013.01); *H05K 999/00* (2013.01); *H05K 999/99* (2013.01); *G09B 29/00* (2013.01)

(56) References Cited

U.S. PATENT DOCUMENTS

| | | | |
|---|---|---|---|
| 8,917,274 B2 | 12/2014 | Ma et al. | |
| 9,626,088 B2 | 4/2017 | Ma et al. | |
| 9,852,195 B2 | 12/2017 | Ma et al. | |
| 10,482,097 B2 | 11/2019 | Ma et al. | |
| 2004/0090472 A1* | 5/2004 | Risch | G06F 16/9038 715/853 |
| 2004/0095349 A1* | 5/2004 | Bito | G06T 11/20 345/440 |
| 2012/0019559 A1* | 1/2012 | Siler | G06T 11/206 345/634 |
| 2013/0002676 A1* | 1/2013 | Ziemann | G06T 11/20 345/440 |
| 2013/0097180 A1* | 4/2013 | Tseng | G06F 16/9535 707/748 |
| 2013/0106860 A1* | 5/2013 | De Pauw | G06T 11/20 345/440 |
| 2013/0335419 A1* | 12/2013 | Bondesen | G06T 11/206 345/440 |
| 2014/0189536 A1* | 7/2014 | Lange | G06F 16/48 715/753 |
| 2015/0127628 A1* | 5/2015 | Rathod | G06F 16/955 707/710 |

OTHER PUBLICATIONS

A. Sheth and M. Perry, "Traveling the Semantic Web through Space, Time, and Theme," in IEEE Internet Computing, vol. 12, No. 2, pp. 81-86, Mar.-Apr. 2008, doi: 10.1109/MIC.2008.46. (Year: 2008).*

L. Xie, H. Sundaram and M. Campbell, "Event Mining in Multimedia Streams," in Proceedings of the IEEE, vol. 96, No. 4, pp. 623-647, Apr. 2008, doi: 10.1109/JPROC.2008.916362. (Year: 2008).*

J. J Hoxha and A. Brahaj, "Open Government Data on the Web: A Semantic Approach," 2011 International Conference on Emerging Intelligent Data and Web Technologies, Tirana, 2011, pp. 107-113, doi: 10.1109/EIDWT.2011.24. (Year: 2011).*

Official Communication for Australian Patent Application No. 2014201568 dated Nov. 8, 2018.

Official Communication for Australian Patent Application No. 2014201568 dated Feb. 13, 2019.

* cited by examiner

SYSTEM AND METHOD FOR GENERATING EVENT VISUALIZATIONS

INCORPORATION BY REFERENCE TO ANY PRIORITY APPLICATIONS

This application is a continuation of U.S. patent application Ser. No. 15/851,249 entitled "SYSTEM AND METHOD FOR GENERATING EVENT VISUALIZATIONS," filed Dec. 21, 2017, which is a continuation of U.S. patent application Ser. No. 15/397,562 entitled "SYSTEM AND METHOD FOR GENERATING EVENT VISUALIZATIONS," filed Jan. 3, 2017, now U.S. Pat. No. 9,852,195, which is a continuation of U.S. patent application Ser. No. 14/570,914 entitled "SYSTEM AND METHOD FOR GENERATING EVENT VISUALIZATIONS," filed Dec. 15, 2014, now U.S. Pat. No. 9,626,088, which is a continuation of U.S. patent application Ser. No. 14/135,289 entitled "EVENT MATRIX BASED ON INTEGRATED DATA," filed Dec. 19, 2013, now U.S. Pat. No. 8,917,274, which claims benefit of U.S. Provisional Application No. 61/798,581 entitled "EVENT MATRIX BASED ON INTEGRATED DATA," filed Mar. 15, 2013. Each of these applications are hereby incorporated by reference herein in their entireties.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration, analysis, and visualization. More specifically, it relates to visualization of connections between events and persons, places, things, etc.

BACKGROUND

Computers enable the collection and storage of vast amounts of data in easily accessible databases. Patterns, connections, and other features of this data may provide valuable insights, but the volume of the information may present challenges for analysis. Visualizations may be used to overcome these challenges by representing aspects of the data in a visual manner, e.g., in a graph or diagram. Visualizations of a large data set may be substantially more intuitive and useful than, e.g., a textual representation of the underlying data or a set of statistics drawn from the data.

Like other aspects of large-scale data analysis, producing visualizations may be challenging when the input data is not uniformly structured. Inconsistent structure is particularly common in data drawn from many different sources, which people are increasingly interested in analyzing. Data integration platforms have been created to combine data from different sources for the purpose of analysis, but the visualization functionality they provide may be limited.

A visualization that is useful for drawing insights from one data set may not be useful for drawing insights from another data set. Therefore, some platforms may support a variety of different visualizations. Each type of visualization may have unique limitations. For example, certain visualizations may be useful for analyzing only a few specific kinds of data. Other visualizations may be useful for trained analysts following specific lines of inquiry, but may not be useful for lay persons needing an intuitive overview of relevant information. There is a need for visualizations that overcome these limits, with broad utility and intuitive readability.

SUMMARY

Embodiments described herein may be used to produce visualizations that depict connections between objects from an integrated data set. A visualization of this sort may be organized chronologically, and may be referred to as an "event matrix."

In one embodiment, a system for generating visualizations of integrated data comprises at least one processor, and data storage comprising instructions executable by the processor. When executed, the instructions may cause the system to receive input data from a plurality of data sources and determine a set of objects from the input data based on an ontology comprising a plurality of object types. The system may store the objects in one or more databases. The system may also identify a first subset of the determined set of objects, wherein the first subset comprises event objects; identify a second subset of the determined set of objects, wherein the second subset of objects comprises non-event objects; and identify a set of links between objects in the first subset and objects in the second subset. In addition, the system may generate first labels corresponding to the objects in the first subset, second labels corresponding to the objects in the second subset, and indicators corresponding to links in the set of links. The system may arrange the first labels in a first spatial dimension, wherein an order of the arranged first labels is based at least in part on dates and/or times associated with the event objects in the first subset; arrange the second labels in a second spatial dimension; and present a visualization comprising the labels and the indicators. Within the visualization, each indicator may have a location corresponding in the first spatial dimension to a position of one of the first labels and corresponding in the second spatial dimension to a position of one of the second labels.

In another embodiment, a method for generating visualizations of integrated data comprises receiving input data from a plurality of sources and determining a set of objects from the input data based on an ontology comprising a plurality of object types. The method further comprises identifying a first subset of the determined set of objects (wherein at least some of the objects in the first subset are associated with dates), identifying a second subset of the determined set of objects, and identifying (by a computer system having at least one computer processor) a set of links between objects in the first subset and objects in the second subset. The method also comprises determining (by the computer system) first labels corresponding to the objects in the first subset and second labels corresponding to the objects in the second subset, and generating (by the computer system) a user interface. The user interface may comprise the first labels arranged in a first spatial dimension, based at least in part on dates associated with respective objects in the first subset. The user interface may also comprise the second labels arranged in a second spatial dimension. For each link in the set of links, the user interface may further comprise an indicator positioned at a location corresponding in the first spatial dimension to a first label associated with the respective link and corresponding in the second spatial dimension to a second label associated with the respective link. As noted above, this method may be performed using one or more computer processors.

In another embodiment, non-transitory computer storage may comprise instructions for causing a computer system to generate visualizations of integrated data, as follows. The storage may comprise instructions for receiving input data from a plurality of data sources and determining a set of objects from the input data based on an ontology comprising a plurality of object types. Further instructions may be included for identifying a first subset of the determined set of objects (wherein at least some of the objects of the first subset are associated with dates), identifying a second subset of the determined set of objects, and identifying a set of links between objects in the first subset and objects in the second subset. Instructions may also be provided for determining first labels corresponding to the objects in the first subset, second labels corresponding to the objects in the second subset, and indicators corresponding to links in the set of links. In addition, instructions may be provided for arranging the first labels in a first spatial dimension and arranging the second labels in a second spatial dimension. The arrangement of the first labels may be based in part on the dates associated with the objects in the first subset. Finally, the computer storage may include instructions for presenting a visualization comprising the labels and the indicators, wherein each of the indicators has a location corresponding in the first spatial dimension to a position of one of the first labels and corresponding in the second spatial dimension to a position of one of the second labels.

DETAILED DESCRIPTION OF SPECIFIC EMBODIMENTS

Overview

Data integration platforms may support data with widely varying form and content. Accordingly, visualizations that require overly specific inputs may have limited utility on such platforms. However, certain features may be common enough in integrated data sets that a visualization can rely on them without substantially constraining its usefulness.

Common features of integrated data sets include connections between various pieces of data. In general, integrated data sets are integrated for a reason. Specifically, data from multiple sources is likely to be integrated because a person believes that various pieces of the data are somehow related. In other words, the person believes that connections exist within the data. Such connections may be identified explicitly with the help of the integration platform.

In addition to connections, integrated data sets commonly include date and time information (referred to hereafter as "dates" for the sake of brevity). The prevalence of dates in integrated data sets may be a result of the fact that these data sets often record occurrences in the real world. Real-world occurrences necessarily happen on particular dates, and dates are easy to ascertain automatically at the time of an occurrence. Therefore, records of real-world occurrences, and the integrated data sets that contain such records, routinely include dates.

Dates also provide a useful basis for organization. They provide a frame of reference that all people are familiar with. As a result, a visualization that is organized chronologically accordingly to a sequence of dates many be simple to understand, even for people who lack specialized training or prior familiarity with the subject matter being visualized.

An event matrix is a visualization that may be organized chronologically and used to present connections between objects from an integrated data set. It may be generated from any set of data objects with dates and connections. Because of its organization and minimal input requirements, the event matrix is broadly useful and intuitively readable.

Figure 1:
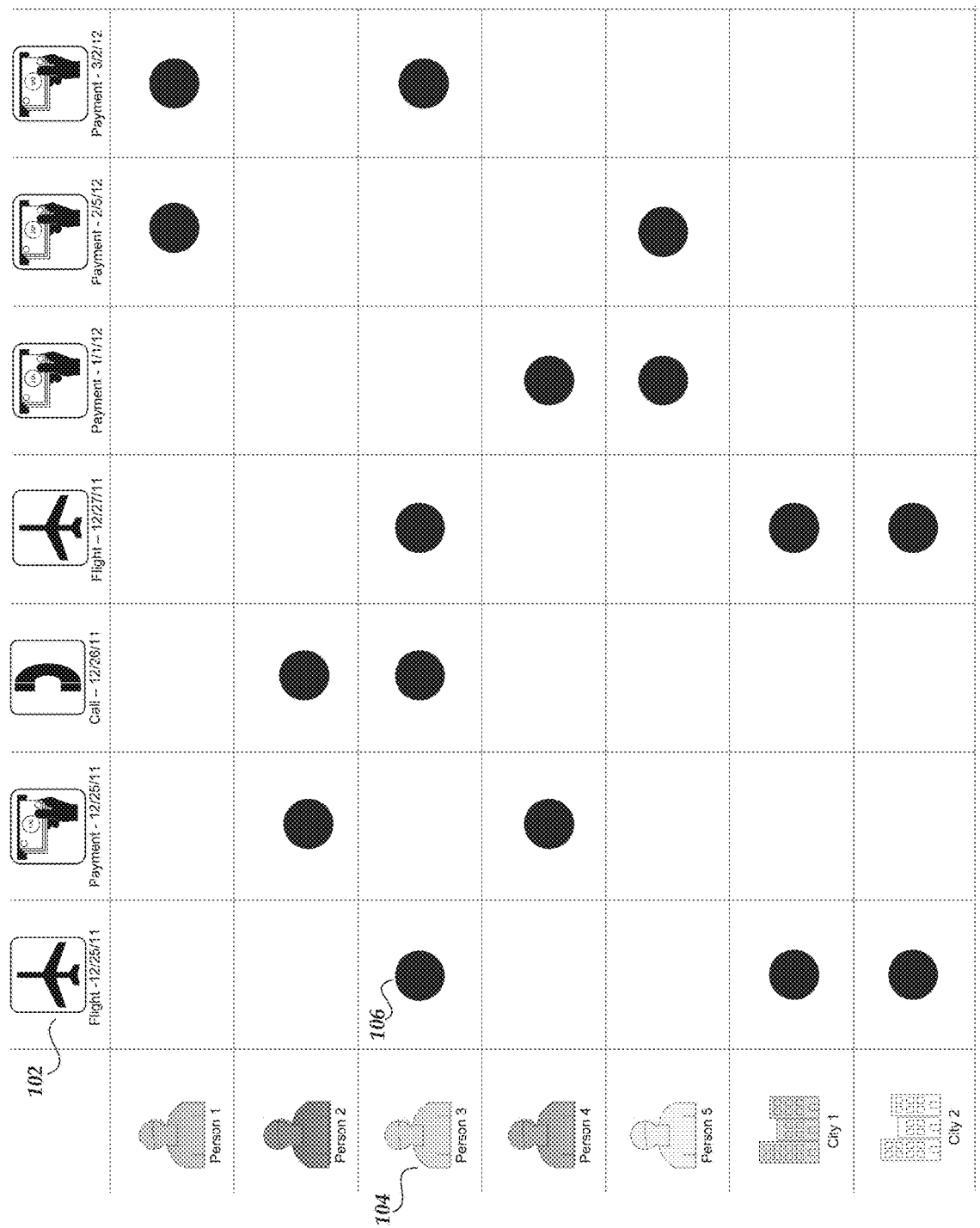
FIG. 1 illustrates a sample of an event matrix.

FIG. 1 depicts an example of an event matrix. The matrix includes rows and columns with labels corresponding to particular objects. For example, label 102 corresponds to a "flight" object, and label 104 corresponds to a "person" object. At the intersection of certain rows and columns, indicators may be provided to indicate that a connection exists between the object associated with the row and the object associated with the column. For example, indicator 106 indicates that a connection exists between the flight object designated by label 102 and the person object designated by label 104. Of course, these data objects may correspond, respectively, to an actual flight and an actual person in the real world. Accordingly, the aforementioned connection may exist because the actual person (Person 3, as indicated by label 104) took the actual flight (on Dec. 25, 2011, as indicated by label 102).

The event matrix may be useful in part because it facilitates recognition of correlations and indirect connections between several objects. For example, while Person 1 and Person 2 are not directly connected in FIG. 1, they are indirectly connected through Person 3, who shared a phone call with Person 2 on Dec. 26, 2011, and shared a payment with Person 1 on Mar. 2, 2012. The event matrix makes it easy to identify indirect connections like this, simply by "connecting the dots," where the dots are indicators of links between objects. Similarly, a correlation might be identified, e.g., where calls between a first person and a second person are consistently followed by payments between the second person and a third person. In a scenario like this, the same geometric pattern of indicators would repeat itself multiple times within the event matrix, making the correlation relatively easy to identify.

The connections that are represented by indicators in the event matrix may be stored as links within an integrated data set. As described below, these links may be part of an ontology that includes various link types. In some cases, the existence of a particular link may be specified explicitly within a source of input data. In other cases, the integration platform may be configured to infer the existence of particular links based on a set of rules, which may be customizable. The integration platform may also make inferences in order to determine when the same object is involved in multiple relationships across multiple data sources. For example, if a person listed in a database of payment records and a person listed in a database of flight records both share the same name and date of birth, the integration platform may infer that they are the same person. Then, if the integration platform creates a link for one of the payment records and a link for one of the flight records, it may associate both link objects with the same person object. This way, all links involving the same person (or other entity)

may be consolidated, and among other things, displayed in the same area of the event matrix.

As depicted in FIG. 1, the objects corresponding to each column label may be event objects ("events"), and the objects corresponding to each row label may be non-event objects ("non-events"). Events are described in greater detail below, as are objects and object types more generally. Notably, events may be associated with specific dates or date ranges. As described earlier, dates provide an intuitive basis for organization, so the columns in an event matrix may be organized chronologically according to the dates associated with the each event. In some cases, the dates associated with an event may be unknown or incorrect, so the order may be adjusted manually by a user. For example, a user may reorder events by dragging one or more of the columns to a new position relative to the other columns in the matrix, e.g., using a computer mouse or a touch-sensitive display screen. Similarly, a user may reorder non-events by dragging one or more rows.

The scope of the present disclosure is not limited to event matrices with any particular formatting or aesthetic features. Specifically, the formatting and aesthetic features of FIG. 1 are merely illustrative. For example, labels for different objects or object types may have different icons, as shown in FIG. 1. In some embodiments, however, some or all labels may not include any icons. Labels may be determined from properties, links, or other parts of an ontology. Labels may be customized and updated by a user. The user may also specify rules for generating labels based on information in the ontology, and rules may be applied selectively based on relevant criteria. For example, different rules may be provided for different object types. Additionally, while the link indicators discussed herein are depicted as circles, any other type of indicator may be used. Additionally, different types of indicators may be used to illustrate different correlations of event and non-event objects. Thus, a first association between a person and a call may be represented on an event matrix with a first indicator, while an association between a person and a flight may be associated with a second, different, indicator.

Indicators or indications of inter-object connections may vary, and need not bear any particular similarity to the indicators of FIG. 1. An event matrix may be flipped, rotated, scaled, or otherwise rearranged, e.g., so that events correspond to rows rather than columns. Accordingly, objects in the event matrix may be arranged in spatial dimensions other than those illustrated in FIG. 1. In addition to formatting and aesthetic features that are automatically generated, some aspects of an event matrix's appearance may be manually specified by a user. For example, a user may specify a particular background color for one or more rows, objects or property types, columns, time ranges, or cells, which may be useful for focusing a reader's attention. Labels, including both icons and text, may be specified manually as well.

Additional considerations and techniques relevant to the generation of event matrices are described below.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
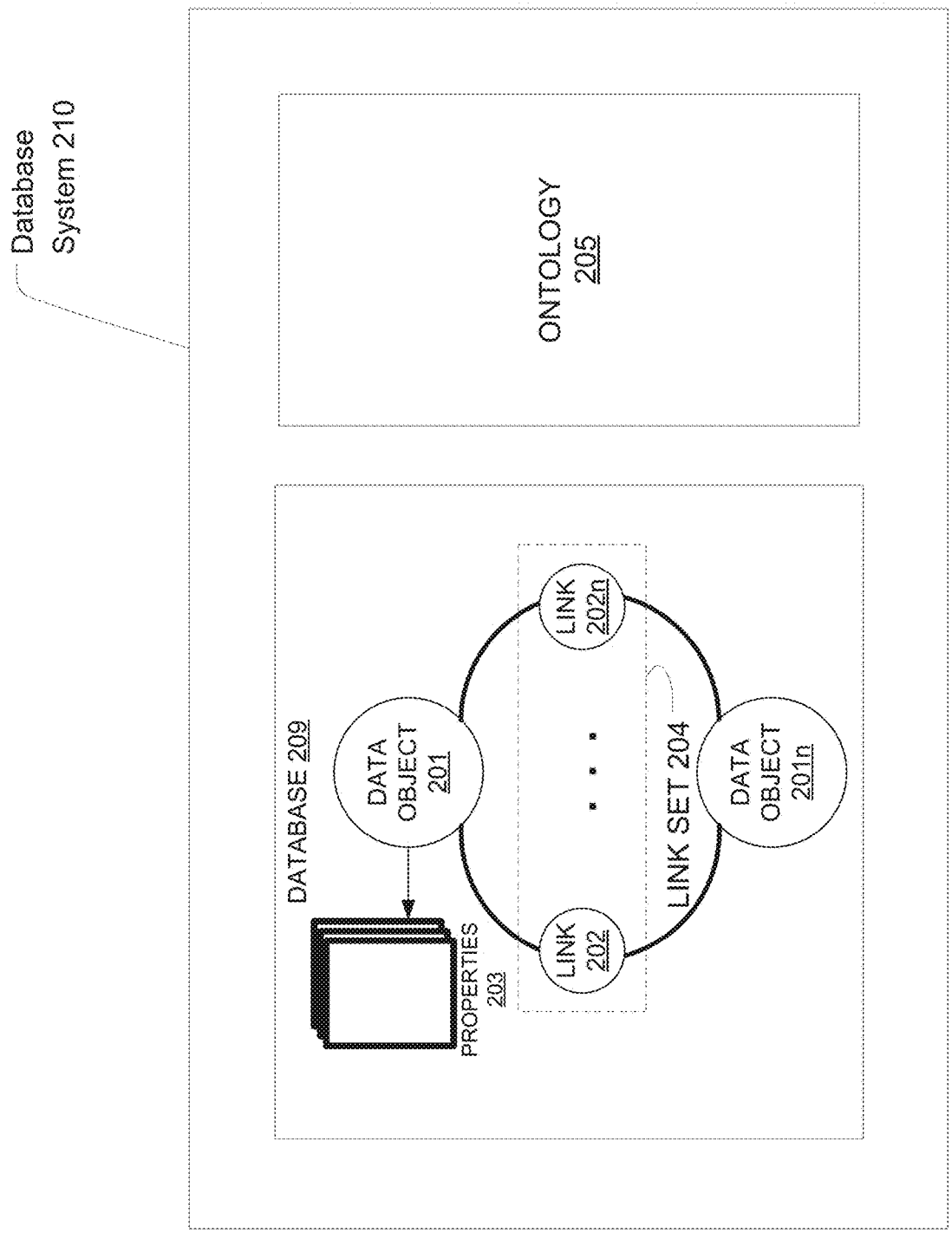
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
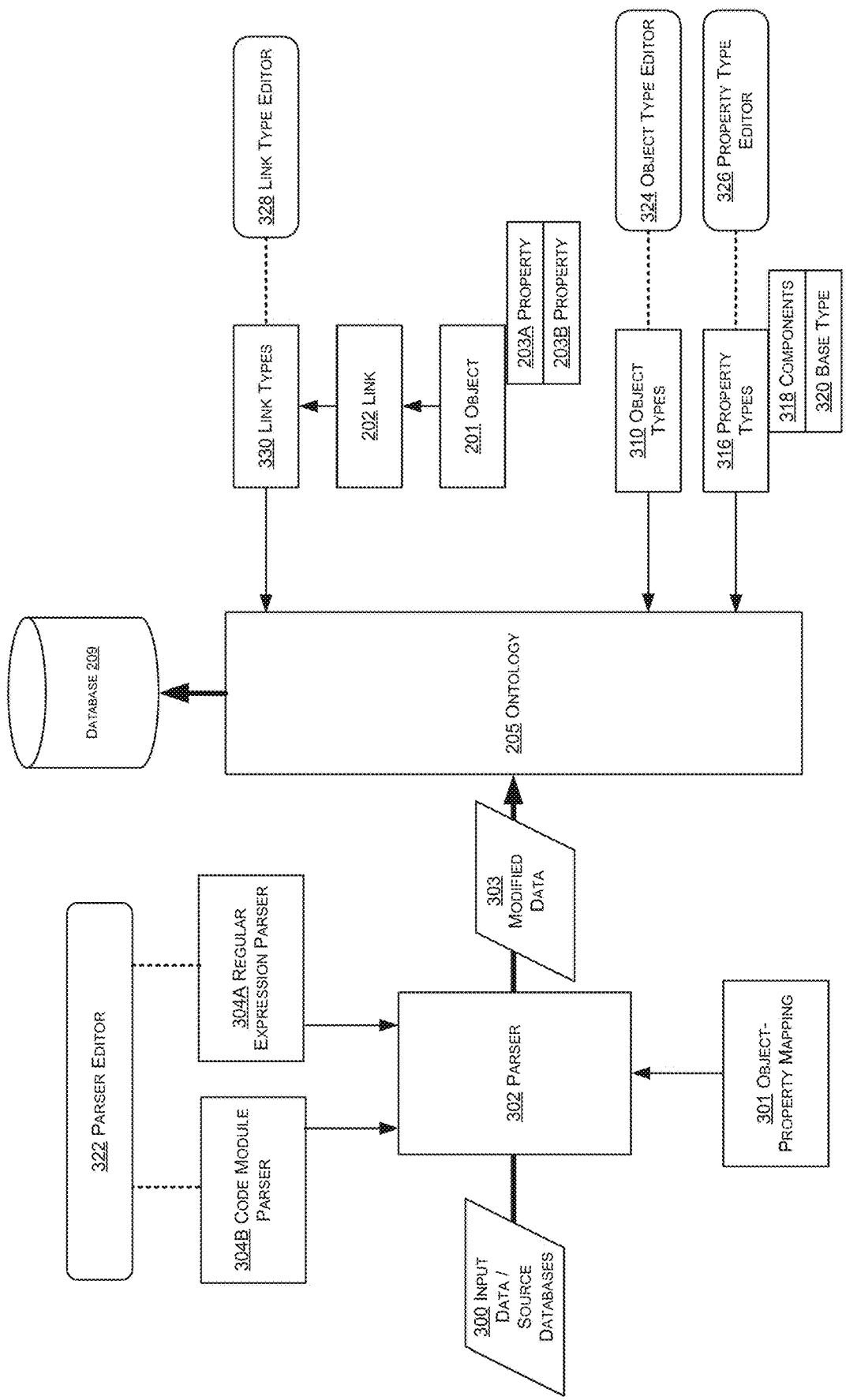
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 to determine which object type 310 should receive data from a record created from the input data, and which property types 316 should be assigned to data from individual field values in the input data. Based on object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4:
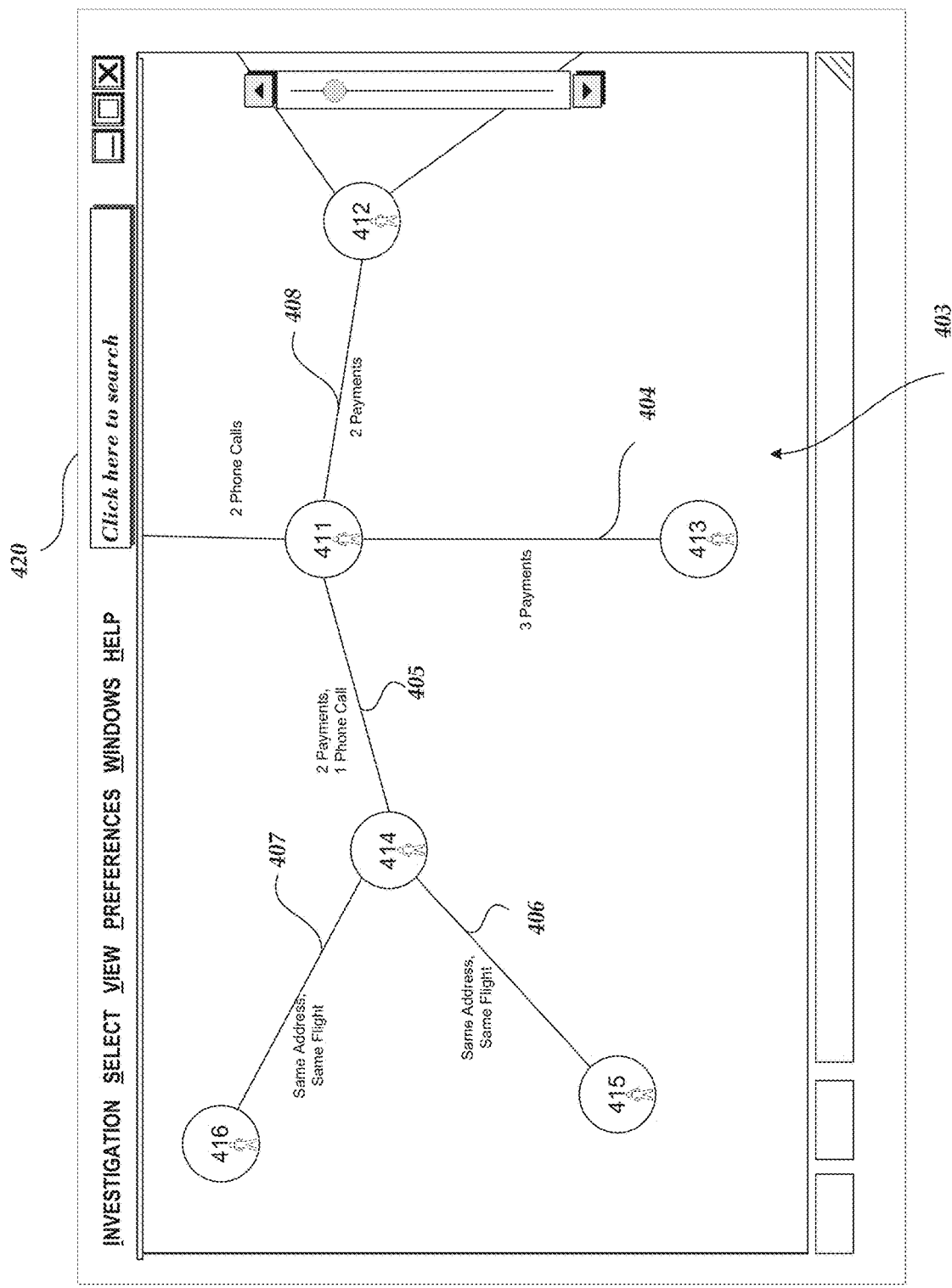
FIG. 4 illustrates a sample user interface using relationships described in a data store using a dynamic ontology.

The properties, objects, and the links (e.g. relationships) between the objects can be visualized using a graphical user interface (GUI). For example, FIG. 4 displays a user interface showing a graph representation 403 of relationships (including relationships or links 404, 405, 406, 407, 408) between the data objects (including data objects 411, 412, 413, 414, 415, 416) that are represented as nodes in the example of FIG. 4. In this embodiment, the data objects are person objects. In this example, the person nodes (associated with person data objects) may have relationships to other person nodes, for example, through payment objects. For example, relationship 404 is based on a payment associated with the individuals indicated in person data objects 411 and 413. The link 404 represents these shared payments (for example, the individual associated with data object 411 may have paid the individual associated with data object 413 on three occasions). These relationships may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 420 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Example Method of Generating Event Matrix

Figure 5:
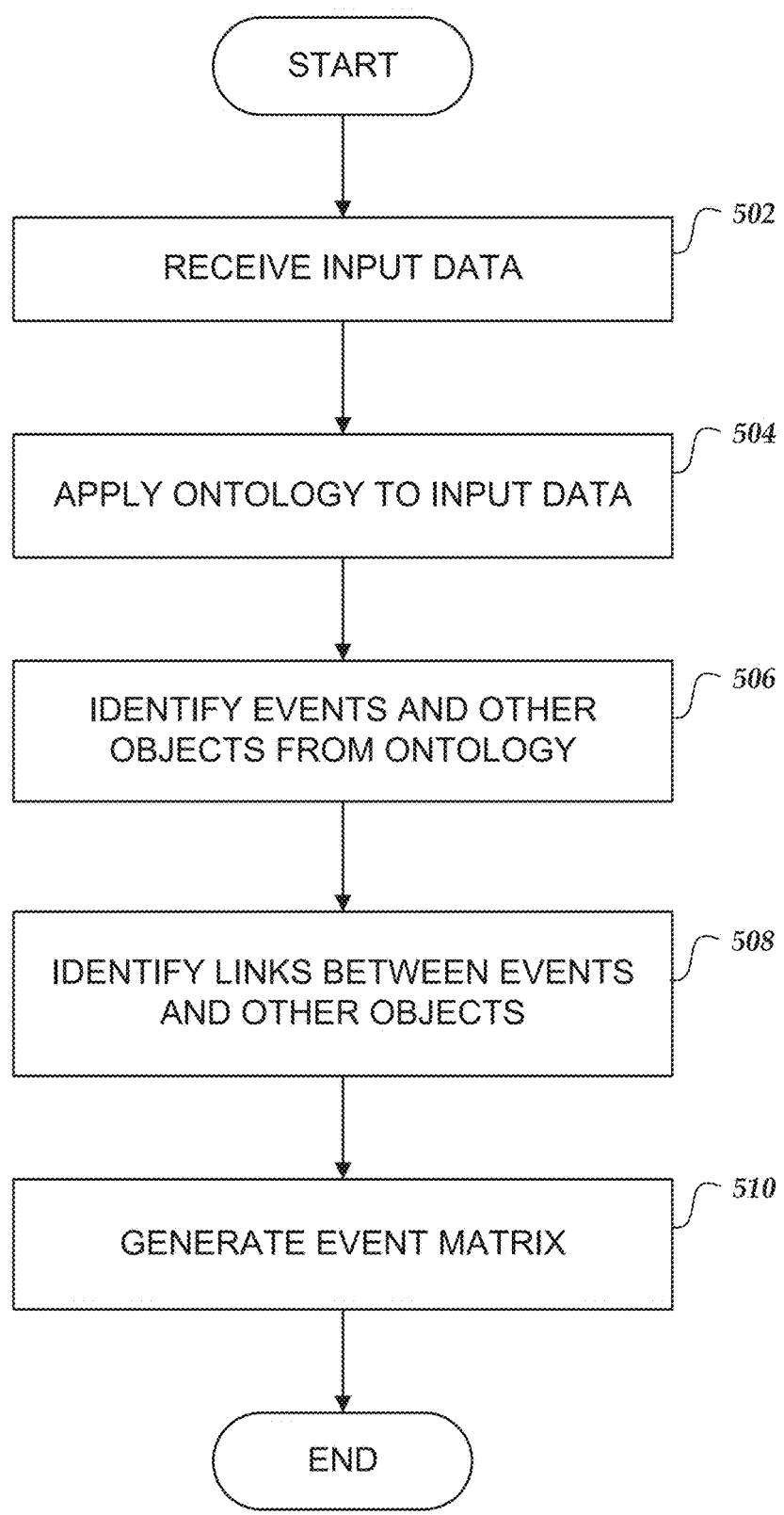
FIG. 5 illustrates one embodiment of a process for creating an event matrix.

As described earlier in this disclosure, an event matrix is a particularly useful and intuitive type of visualization for integrated data. An example of an event matrix was previously presented in FIG. 1. Turning now to FIG. 5, an example process is presented for generating an event matrix. This process may be implemented, e.g., by a data integration platform comprising a computer system that includes the data and components of FIG. 3. Additional disclosure related to computer systems is provided below, with respect to FIG. 6. The process of FIG. 5 begins at block 502, where input data is received. This input data may correspond to, e.g., input data 300 of FIG. 3. At block 504, an ontology is applied to the input data, providing an integrated interface to facilitate further analysis. This ontology may correspond to, e.g., ontology 205 of FIGS. 2 and 3.

Continuing at block 506, events and non-event objects are identified from the ontology. Objects from the ontology may be identified based on selection by a user, e.g., using the interface of FIG. 4. The interface may include a button, menu item, hotkey, or other means for the user to request generation of an event matrix based on the selected objects. In one example, selected objects may be dragged into a designated area to create a new event matrix, or they may be dragged into an existing matrix, which may be updated to include the selected items. Objects may also be identified automatically, in addition to or instead of being selected manually. For example, if a user presses a button to create an event matrix without selecting any objects, the event matrix may include all objects that are currently visible on the user's display, or all visible objects plus all objects that are linked to the visible objects. In certain embodiments, some of the selected objects may be excluded, e.g., based on criteria related to compatibility with an event matrix or with each other. For example, a selected object may be excluded if it is part of an object type that does not include date or time information, and if it is not connected to an object that includes date or time information.

At block 508, links between events and other objects are identified. These links may correspond to, e.g., link 202 of FIGS. 2 and 3. A link may be determined from any association, connection, or relationship that is included explicitly or implicitly in the ontology. Some or all of the identified links may be created for the first time during the process of FIG. 5. Any means of establishing links between objects may be used.

At block 510, an event matrix user interface, configured for display on an electronic display device and/or for printing on paper, is generated. In one embodiment, the user interface includes labels associated with each identified object and link indicators indicating links between objects. The labels and indicators may be arranged at least in part on the basis of dates and/or times associated with the events. If an event has no date or time information, it may appear at the end of the event matrix.

The arranged labels and indicators may be combined with various formatting, styling, and other aesthetic features in order to form a completed event matrix, such as the matrix of FIG. 1. In some embodiments, one or more rows, columns, cells, labels or indicators may be highlighted. Highlighting may be added automatically, based on customizable rules, or on an ad hoc basis. In one embodiment, a user may add an object to the event matrix by dragging it from graph representation 403 of FIG. 4. The completed event matrix may be displayed, printed, transmitted, or otherwise presented to one or more users and/or readers.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
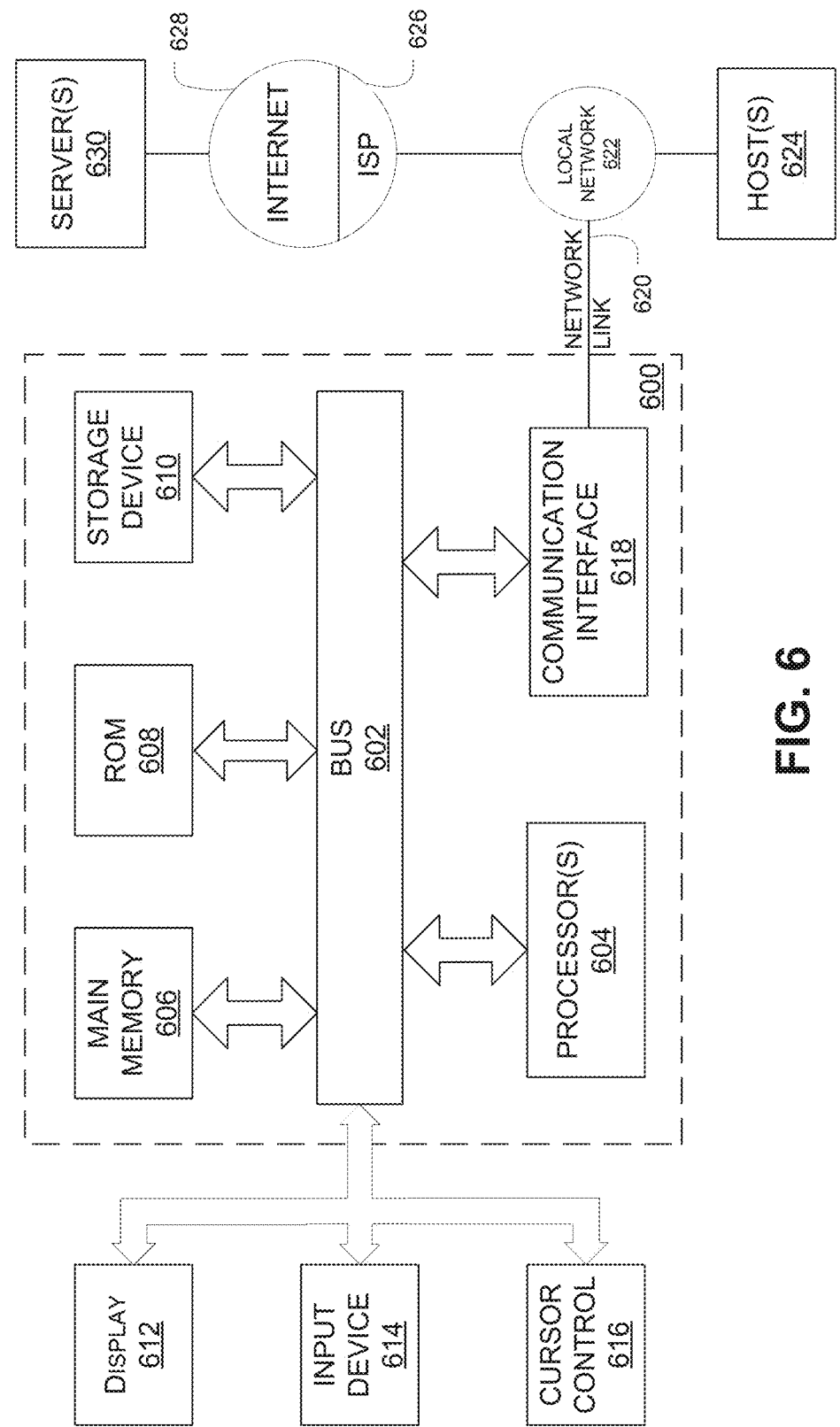
FIG. 6 illustrates a computer system with which certain methods discussed herein may be implemented.

For example, FIG. 6 is a block diagram that illustrates a computer system 600 upon which an embodiment may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer implemented method comprising:
by a computer system comprising one or more computer hardware processors and one or more storage devices,
receiving, from a first database, (i) a first data record and (ii) a first attribute associated with the first data record;
receiving, from a second database different from the first database, (i) a second data record and (ii) a second attribute associated with the second data record;
creating a first event object based at least on the first data record;
creating a second event object based at least on the second data record;
identifying a first association between an entity object and the first event object based at least on the first attribute;
in response to identifying the first association, creating a first link between the entity object and the first event object;
identifying a second association between the entity object and the second event object based at least on the second attribute;
in response to identifying the second association, creating a second link between the entity object and the second event object; and
causing presentation of:
a plurality of event labels in a first spatial dimension, wherein the plurality of event labels comprises a first event label and a second event label, and wherein the first event label is associated with the first event object and the second event label is associated with the second event object,
a plurality of entity labels in a second spatial dimension, wherein an entity label of the plurality of entity labels is associated with the entity object, and
a visualization comprising:
a first indicator at a first intersection of the first event label and the entity label according to the first link, and
a second indicator at a second intersection of the second event label and the entity label according to the second link.

2. The computer implemented method of claim 1, wherein identifying the first association further comprises:
applying a rule comprising a condition to the first attribute; and
determining that the condition is satisfied by the first attribute.

3. The computer implemented method of claim 2, wherein the entity object is associated with a third attribute, and wherein applying the rule further comprises:
determining that the first attribute corresponds to the third attribute.

4. The computer implemented method of claim 1, wherein creating the first link between the entity object and the first event object further comprises:
identifying, from a data model, a first link type; and
creating the first link based at least on the first link type.

5. The computer implemented method of claim 4, wherein identifying, from the data model, the first link type further comprises:
determining that the first data record originated from a first data source; and
identifying a mapping, from the data model, of the first data source to the first link type.

6. The computer implemented method of claim 1, where the first data record comprises the first attribute.

7. A system comprising:
a first data storage medium configured to store a first database comprising (i) a first data record indicating a first event and (ii) a first attribute associated with the first data record;
a second data storage medium configured to store a second database different from the first database, the second database comprising (i) a second data record indicating a second event and (ii) a second attribute associated with the second data record; and
one or more computer hardware processors in communication with the first data storage medium and the second data storage medium, wherein the one or more computer hardware processors are configured to execute computer-executable instructions to at least:
create a first event object for the first event based at least on the first data record;
create a second event object for the second event based at least on the second data record;
identify a first association between an entity object and the first event object based at least on the first attribute;
in response to identifying the first association, creating a first link between the entity object and the first event object;
identify a second association between the entity object and the second event object based at least on the second attribute;
in response to identifying the second association, creating a second link between the entity object and the second event object; and
cause presentation of:
a plurality of event labels in a first spatial dimension, wherein the plurality of event labels comprises a first event label and a second event label, and wherein the first event label is associated with the first event object and the second event label is associated with the second event object,
a plurality of entity labels in a second spatial dimension, wherein an entity label of the plurality of entity labels is associated with the entity object, and
a visualization comprising:
a first indicator at a first intersection of the first event label and the entity label according to the first link, and a second indicator at a second intersection of the second event label and the entity label according to the second link.

8. The system of claim 7, wherein identifying the first association further comprises:
applying a rule comprising a condition to the first attribute; and
determining that the condition is satisfied by the first attribute.

9. The system of claim 8, wherein the entity object is associated with a third attribute, and wherein applying the rule further comprises:
determining that the first attribute corresponds to the third attribute.

10. The system of claim 9, wherein the first attribute comprises at least one of a name, data of birth, or address.

11. The system of claim 9, wherein determining that the first attribute corresponds to the third attribute further comprises determining at least one of:
(i) a similarity between the first attribute and the third attribute, or
(ii) that the first attribute and the third attribute are identical.

12. The system of claim 7, wherein the first event label comprises a first graphic representation associated with a first object type for the first event object, and wherein the second event label comprises a second graphic representation different from the first graphic representation, the second graphic representation associated with a second object type for the second event object.

13. The system of claim 7, wherein the first data storage medium is the same as the second data storage medium.

14. A system comprising:
a first data storage medium configured to store a first database comprising (i) a first data record indicating a first event and (ii) a first attribute associated with the first data record;
a second data storage medium configured to store a second database different from the first database, the second database comprising (i) a second data record indicating a second event and (ii) a second attribute associated with the second data record; and
one or more computer hardware processors in communication with the first data storage medium and the second data storage medium, wherein the one or more computer hardware processors are configured to execute computer-executable instructions to at least:
identify a first event object for the first event indicated by the first data record;
identify a second event object for the second event indicated by the second data record;
identify a first association between an entity object and the first event object based at least on the first attribute;
in response to identifying the first association, creating a first link between the entity object and the first event object;
identify a second association between the entity object and the second event object based at least on the second attribute;
in response to identifying the second association, creating a second link between the entity object and the second event object; and
cause presentation of:
a plurality of event labels in a first spatial dimension, wherein the plurality of event labels comprises a first event label and a second event label, and wherein the first event label is associated with the first event object and the second event label is associated with the second event object,
a plurality of entity labels in a second spatial dimension, wherein an entity label of the plurality of entity labels is associated with the entity object, and
a visualization comprising:
a first indicator at a first intersection of the first event label and the entity label according to the first link, and
a second indicator at a second intersection of the second event label and the entity label according to the second link.

15. The system of claim 14, wherein identifying the first association further comprises:
applying a rule comprising a condition to the first attribute; and
determining that the condition is satisfied by the first attribute.

16. The system of claim 15, wherein the entity object is associated with a third attribute, and wherein applying the rule further comprises:
determining that the first attribute corresponds to the third attribute.

17. The system of claim 16, wherein determining that the first attribute corresponds to the third attribute further comprises determining at least one of:
(i) a similarity between the first attribute and the third attribute, or
(ii) that the first attribute and the third attribute are identical.

18. The system of claim 14, wherein the first event label comprises a first graphic representation associated with a first object type for the first event object, and wherein the second event label comprises a second graphic representation different from the first graphic representation, the second graphic representation associated with a second object type for the second event object.

19. The system of claim 14, wherein creating the first link between the entity object and the first event object further comprises:
identifying, from a data model, a first link type; and
creating the first link based at least on the first link type.

20. The system of claim 19, wherein identifying, from the data model, the first link type further comprises:
determining that the first data record originated from a first data source; and
identifying a mapping, from the data model, of the first data source to the first link type.

* * * * *